(12) United States Patent
Hashiba

(10) Patent No.: US 6,959,680 B2
(45) Date of Patent: Nov. 1, 2005

(54) RECOIL STARTER

(75) Inventor: Hideki Hashiba, Tokyo (JP)

(73) Assignee: Starting Industrial Co., Ltd., Tokyo (JP)

( * ) Notice: Subject to any disclaimer, the term of this patent is extended or adjusted under 35 U.S.C. 154(b) by 0 days.

(21) Appl. No.: 10/610,602

(22) Filed: Jul. 1, 2003

(65) Prior Publication Data

US 2004/0016311 A1 Jan. 29, 2004

(30) Foreign Application Priority Data

Jul. 24, 2002 (JP) .......................................... 2002-215454
Jul. 24, 2002 (JP) .......................................... 2002-215455

(51) Int. Cl.[7] .............................. F02N 3/02; F02N 5/02
(52) U.S. Cl. ................................ 123/185.14; 123/185.3
(58) Field of Search ...................... 123/185.14, 185.2, 123/185.3, 185.4

(56) References Cited

U.S. PATENT DOCUMENTS

| | | | | |
|---|---|---|---|---|
| 4,841,929 A | * | 6/1989 | Tuggle et al. ............. | 123/185.3 |
| 5,287,832 A | * | 2/1994 | Uhl ........................... | 123/185.3 |
| 2001/0047786 A1 | * | 12/2001 | Kawasaki et al. ....... | 123/185.3 |
| 2002/0121258 A1 | * | 9/2002 | Nieda et al. ........... | 123/185.14 |

* cited by examiner

*Primary Examiner*—Andrew M. Dolinar

(57) ABSTRACT

A recoil starter enabling a power-driven device to be coupled to a crankshaft of an engine in a state where the recoil starter is mounted to the crankshaft on the same side of the engine as the crankshaft is disposed on. A starter housing is provided on an inside thereof with a reel support shaft which projects coaxially with the crankshaft. A rope reel having a recoil rope wound thereon and a cam, which transmits rotation via centrifugal ratchets to the crankshaft, are rotatably mounted on the reel support shaft while they are rotatingly coupled to each other via a damper spring. An opening is formed in the reel support shaft so as to extend from a distal end thereof near the crankshaft to the outside of the starter housing. A drive shaft of the device is coupled to the crankshaft inside the opening.

18 Claims, 12 Drawing Sheets

RECOIL STARTER

BACKGROUND OF THE INVENTION

1. Field of the Invention

The present invention relates to a recoil starter having a recoil rope wound around a rope reel rotatably supported on a reel support shaft inside a starter housing, wherein the recoil rope is pulled to rotate the rope reel so that a rotational force of the rope reel is transmitted via a resilient member to a drive pulley or a flywheel magnet coupled to an engine to rotate the drive pulley or the flywheel magnet, whereby the engine is started.

2. Description of the Related Art

A recoil starter is already known in which a rotational force of a rope reel rotated by pulling a recoil rope is transmitted to a cam rotatably supported coaxially with the rope reel, whereby a drive pulley coupled to a crankshaft of an engine is rotated via a one-way rotative mechanism such as a centrifugal clutch that engages with and disengages from the cam. In this recoil starter, the rope reel and the cam are resiliently coupled by a resilient member interposed between the rope reel and the cam, so that rotation of the rope reel resulting from pulling the recoil rope is transmitted to the cam via the resilient member, whereby a shock resulting from fluctuations in a load of the engine and transmitted to an operator's hand pulling the recoil rope at the time the engine is started is absorbed, and the crankshaft of the engine is rotated via the cam, the one-way rotative mechanism and the drive pulley by releasing the resilient force accumulated in the resilient member by the resilient member resiliently being deformed (e.g., see Japanese Utility Model Application Laid-Open Publication No. 2-149872).

A recoil starter is also known that is provided with a drive wheel which is rotated via a one-way clutch by a rope reel, and a spiral spring serving as an accumulation means interposed between the drive wheel and a cam which transmits rotation to a crankshaft of an engine, wherein the rope reel is rotated by pulling a recoil rope, the drive wheel is rotated via the one-way clutch, a rotational force is accumulated in the accumulation means by rotating the drive wheel when a starting load of an engine is large, and the cam is rotatingly driven by the rotational force accumulated in the accumulation means, whereby the engine is started (e.g., see Japanese Patent Application Laid-Open Publication No. 2001-132591).

In the above-described conventional recoil starters, the starter housing is so constructed that one end side thereof is open so as to cover one side surface of the engine at which an end portion of the crankshaft is disposed and the starter housing is provided with a reel support shaft that is integrally formed on a bottom portion thereof and projects therefrom to face the crankshaft of the engine. Structural parts such as the rope reel, the drive wheel and the cam are rotatably held on the reel support shaft in such a manner that detachment of these parts in an axial direction is prevented by a screw screwed into an end of the reel support shaft. The starter housing is mounted to a casing of the engine so that an open portion thereof faces the flywheel magnet or the drive pulley attached to the crankshaft of the engine.

In the above-described conventional recoil starters, the screw is fixed at the end of the reel support shaft formed on the starter housing in order to prevent the rope reel, the cam and the drive pulley from being detached from the reel support shaft. The starter housing is mounted to the side surface of the engine at which the crankshaft is disposed so as to receive therein the drive pulley or the flywheel magnet attached to the crankshaft of the engine. Accordingly, it is impossible to couple a device driven by the engine to the crankshaft on the side of the engine to which the recoil starter is attached. Also, in a small engine having a cantilever-type crankshaft, the crankshaft of the engine is only disposed at one side of the engine. Thus, there has been the problem that, when a drive shaft of a mower or the like is coupled to the crankshaft, it becomes impossible for the recoil starter to be attached.

SUMMARY OF THE INVENTION

The present invention has been made in view of the foregoing disadvantages of the prior art.

Accordingly, it is an object of the present invention to provide a recoil starter enabling a power-driven device driven by an engine to be coupled to a crankshaft of the engine in a state where the recoil starter is mounted to the crankshaft on the same side of the engine as the crankshaft is disposed on even when the engine has a cantilever-type crankshaft.

In accordance with the present invention, a recoil starter is provided. The recoil starter comprises: a starter housing adapted to be attachable to a side of an engine at which an end portion of a crankshaft of the engine is disposed; a rope reel rotatably supported inside the starter housing and around which is wound a recoil rope having an end pulled out to the outside of the starter housing; a cam rotatably supported coaxially with the rope reel and adapted to be rotated by rotation of the rope reel so as to cause the crankshaft of the engine to rotate via a one-way rotative mechanism; and a resilient means interposed between the rope reel and the cam, for resiliently and rotatingly coupling the rope reel and the cam, a rotational force of the rope reel rotated by pulling the recoil rope being transmitted to the cam via the resilient means, wherein a reel support shaft for rotatably supporting the rope reel and the cam inside the starter housing is formed on and projects from an inner surface of the starter housing toward the crankshaft of the engine; an opening is formed through a center of the reel support shaft in a manner to extend from a distal end thereof near the crankshaft of the engine to the outside of the starter housing; and a drive shaft of a power-driven device which is driven by the engine and disposed at the outside of the starter housing is coupled to the crankshaft of the engine inside the opening.

In a preferred embodiment of the present invention, the resilient means comprises a damper having one end thereof coupled to the rope reel and the other end thereof coupled to the cam so that the damper is adapted to buffer a shock resulting from fluctuations in a starting load of the engine and transmitted to the cam.

In a preferred embodiment of the present invention, the damper comprises a torsion coil spring having one end thereof engaged with the rope reel and the other end thereof engaged with the cam.

In a preferred embodiment of the present invention, the damper comprises a spiral spring having one end thereof engaged with the rope reel and the other end thereof engaged with the cam.

In a preferred embodiment of the present invention, the one-way rotative mechanism comprises a cam pawl formed on an outer peripheral surface of the cam, and a centrifugal ratchet that is provided on a rotating member attached to the crankshaft of the engine, the centrifugal ratchet adapted to engage with and disengage from the cam pawl due to a centrifugal force caused by rotation of the rotating member.

In a preferred embodiment of the present invention, an annular plate is secured to the starter housing so that the rope reel and the cam are brought at outer peripheral portions of respective side surfaces thereof into abutment against the annular plate, whereby the rope reel and the cam are supported so that they are not detached in an axial direction from the reel support shaft.

In a preferred embodiment of the present invention, the recoil starter further includes a drive wheel disposed between the rope reel and the cam so that the drive wheel is permitted to rotate only in one direction through means of a one-way clutch provided between the rope reel and the drive wheel, wherein the resilient means is configured as an accumulation means for accumulating the rotational force of the rope reel side, and wherein the accumulation means is interposed between the drive wheel and the cam so as to accumulate a rotational force of the drive wheel rotated by the rope reel, whereby the cam is rotatingly driven by the rotational force accumulated in the accumulation means to cause the crankshaft of the engine to rotate.

In a preferred embodiment of the present invention, the accumulation means comprise a spiral spring having one end thereof engaged with the drive wheel and the other end thereof engaged with the cam. Alternatively, the accumulation means may comprise a torsion coil spring having one end thereof engaged with the drive wheel and the other end thereof engaged with the cam.

In a preferred embodiment of the present invention, the recoil starter further comprises a ratchet mechanism configured by an engagement tooth formed at an outer peripheral edge of the drive wheel and a ratchet supported on the starter housing so that the ratchet is engageable with the engagement tooth, wherein the ratchet mechanism permits the drive wheel to rotate only in an engine starting direction.

DETAILED DESCRIPTION OF THE INVENTION

Figure 1:
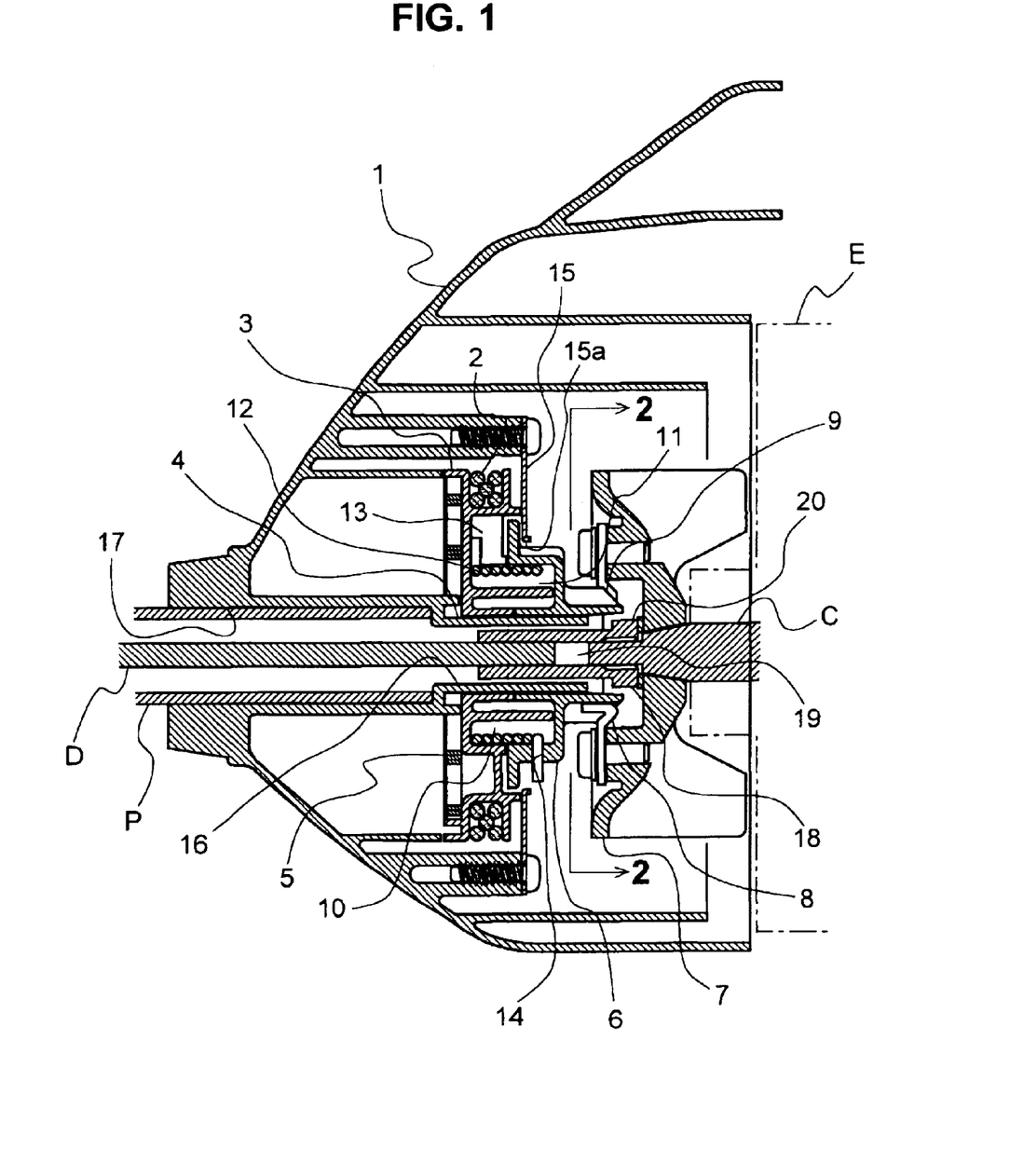
FIG. 1 is an elevational sectional view showing a recoil starter according to an embodiment of the invention.

The invention will be described hereinafter on the basis of embodiments. FIGS. 1 to 6 show a recoil starter according to a first embodiment of the invention. As shown in FIG. 1, the recoil starter includes a starter housing 1 formed to be attachable to one side of an engine E at which an end portion of a crankshaft C is disposed. A main mechanism configuring the recoil starter is mounted inside the starter housing 1. A reel support shaft 4 is integrally formed on an inner side of the starter housing 1 so as to project toward the crankshaft C of the engine E. A rope reel 3 having a recoil rope 2 wound thereon is rotatably supported on the reel support shaft 4. One end of the recoil rope 2 wound around the rope reel 3 is fixed to the rope reel 3, and the other end of the recoil rope 2 is pulled out to the outside of the starter housing 1. The recoil rope 2 is pulled out from the rope reel 3 by gripping and pulling an operating handle (not shown) joined to the other end of the recoil rope 2, whereby the rope reel 3 is rotatingly driven around the reel support shaft 4 in a rotational direction in which the engine is started.

A recoil spring 5 is disposed on a side surface of the rope reel 3 so as to rotate the rope reel 3 in an opposite direction, to thereby rewind the recoil rope 2, which has been pulled out from the rope reel 3 by pulling the recoil rope 2, around the rope reel 3. An end portion of an inner peripheral side of the recoil spring 5 is fixed to the starter housing 1, and the other end portion of the outer peripheral side of the recoil spring 5 is fixed to the rope reel 3. When the recoil rope 2 is pulled and the rope reel 3 is rotated in the rotational direction in which the engine E is started, a rotational force is accumulated in the recoil spring 5. By releasing the recoil rope 2, the rope reel 3 is rotated in the opposite direction by the rotational force accumulated in the recoil spring 5, whereby the recoil rope 2 is rewound around the rope reel 3.

Figure 2:
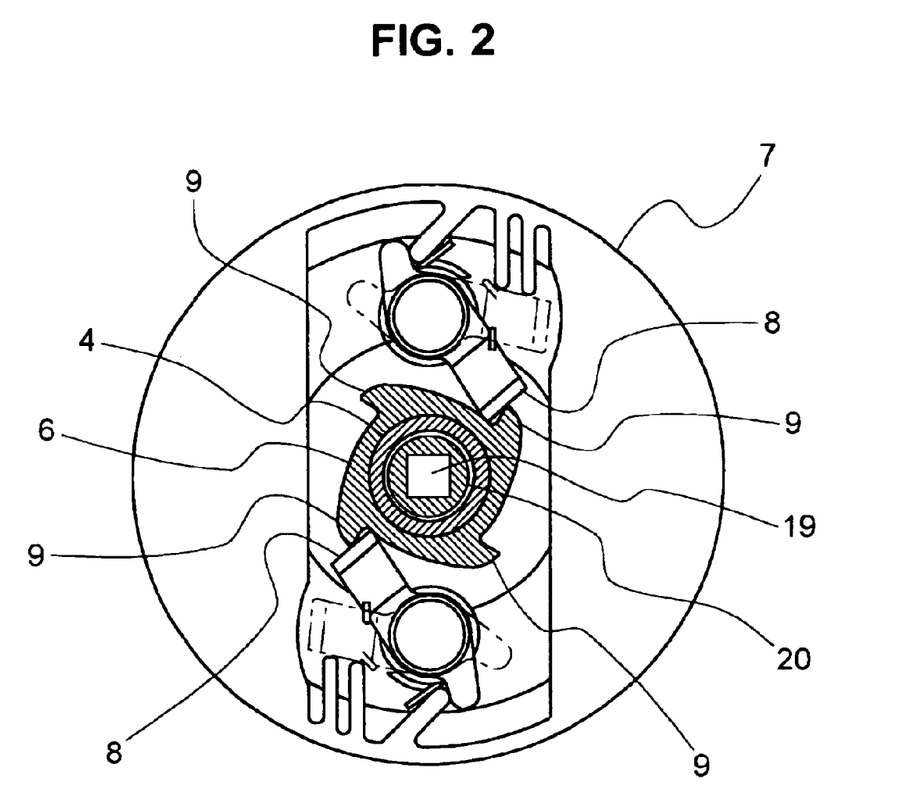
FIG. 2 is a cross-sectional view taken along line 2—2 of FIG. 1.

A cam 6 is rotatably supported on a distal end portion of the reel support shaft 4 formed on the starter housing 1. The cam 6 transmits the rotational force of the rope reel 3 to the engine E via a drive pulley 7 joined to the crankshaft C of the engine E. A one-way rotative mechanism that transmits the rotation of the cam 6 in the engine starting direction to the drive pulley 7 is provided between the cam 6 and the drive pulley 7. As shown in FIG. 2, the one-way rotative mechanism is configured by centrifugal ratchets 8, which are disposed on the drive pulley 7 and rotatingly activated by centrifugal force, and a plurality of cam pawls 9, which are formed on an outer peripheral surface of the cam 6 at intervals in a circumferential direction. Rotation of the cam 6 is transmitted to the drive pulley 7 by the cam pawls 9 engaging with the centrifugal ratchets 8 of the drive pulley 7, whereby the crankshaft C of the engine E is rotated. After the engine E has been started, the drive pulley 7 is rotated by the engine E, whereby the centrifugal ratchets 8 are rotated by a centrifugal force in a direction in which they disengage from the cam pawls 9 and rotational transmission between the engine E and the cam 6 is blocked.

Figure 4:
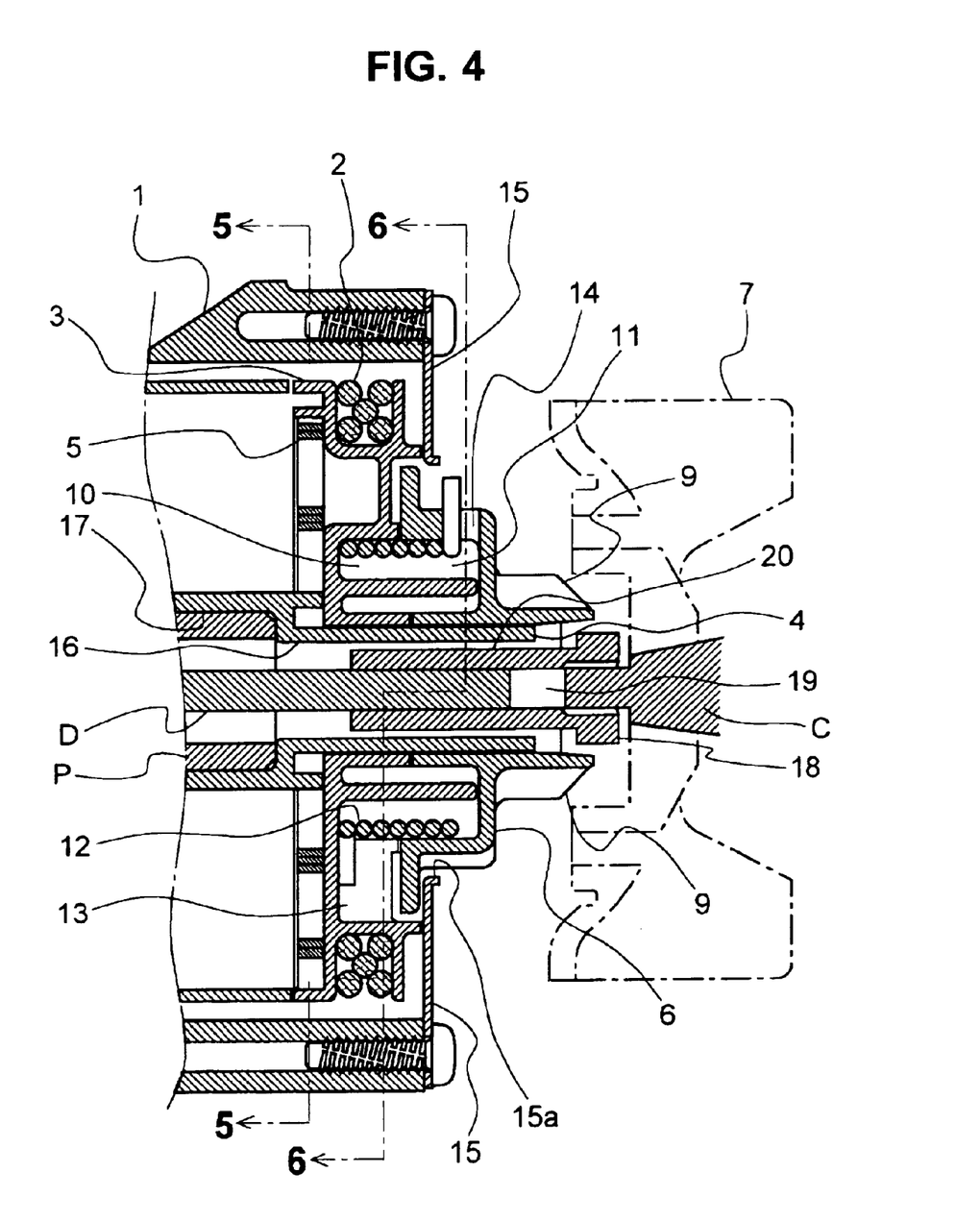
FIG. 4 is an enlarged elevational sectional view showing an essential part of the recoil starter of FIG. 1.
Figure 5:
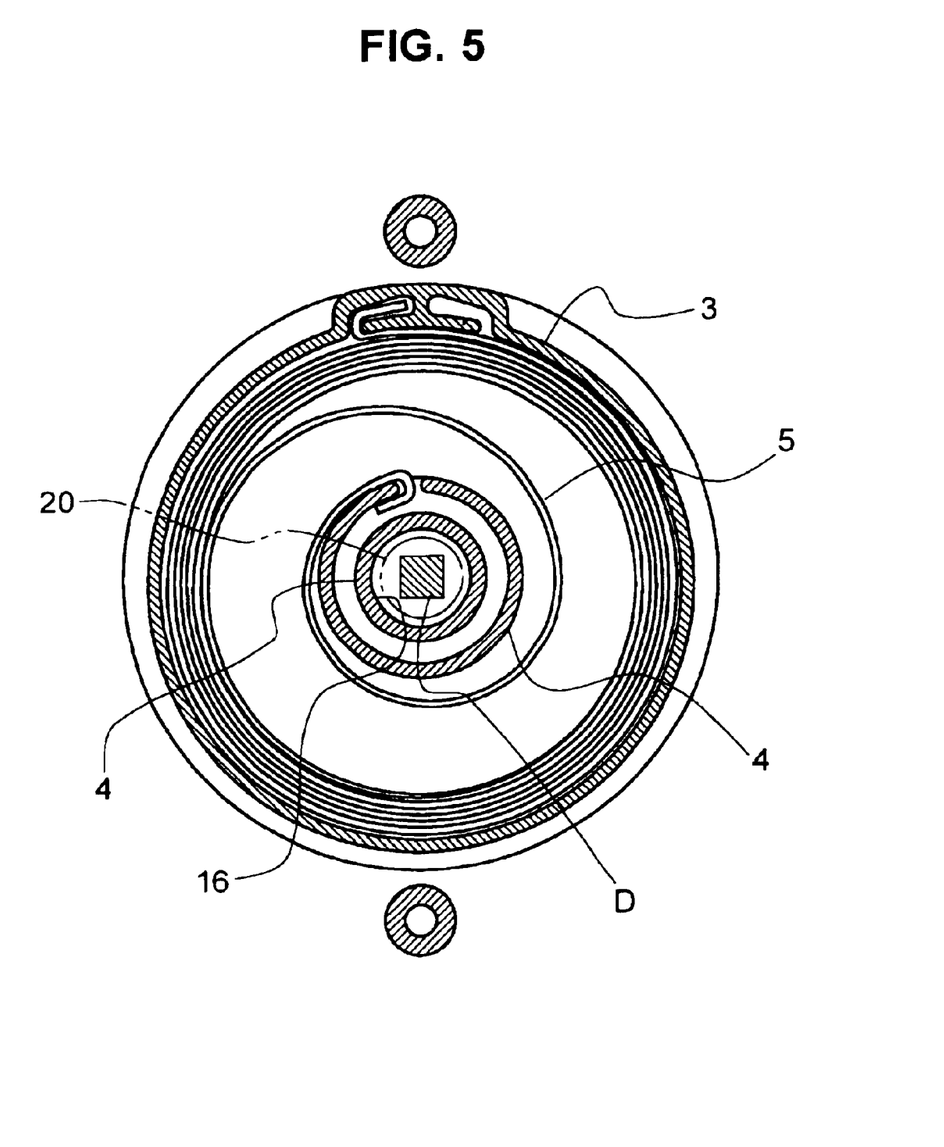
FIG. 5 is a cross-sectional view taken along line 5—5 of FIG. 4.
Figure 6:
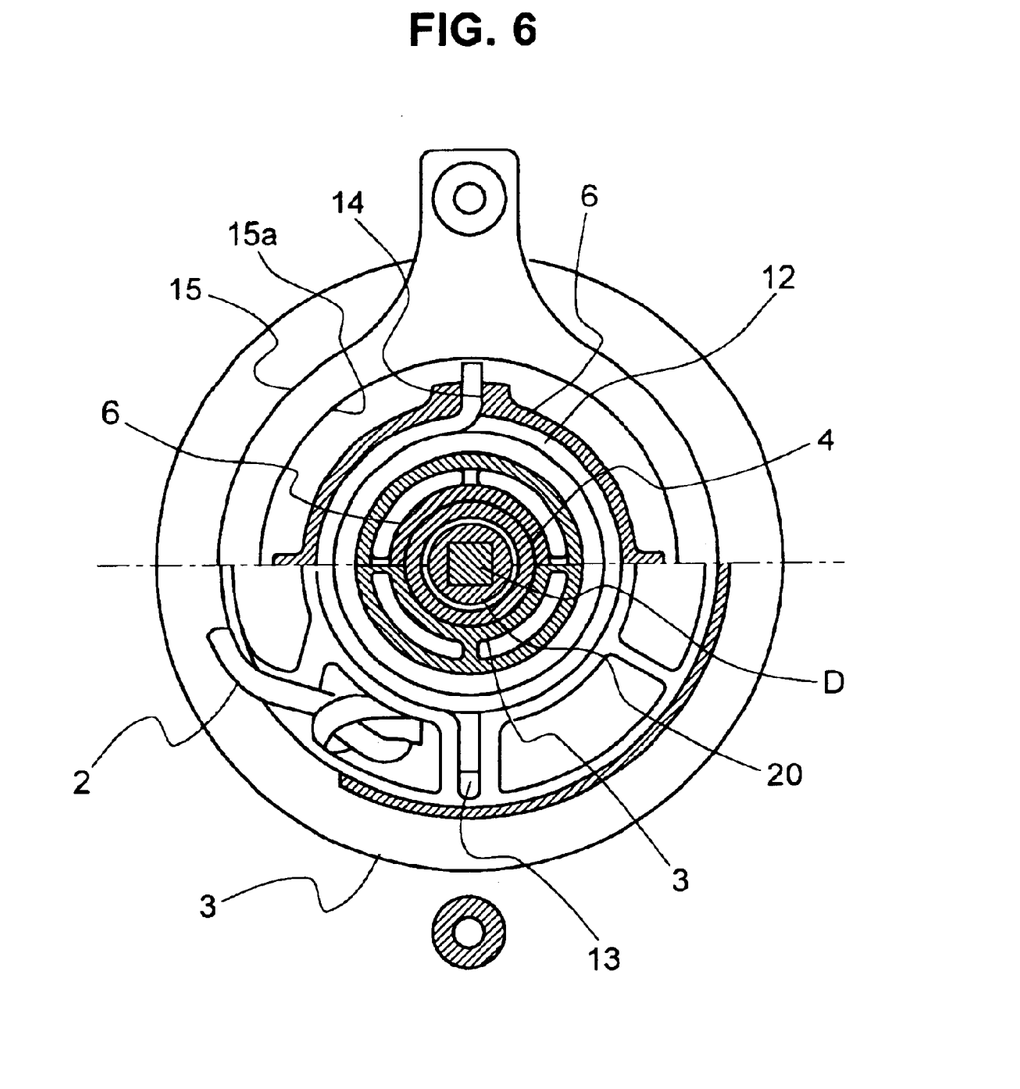
FIG. 6 is a cross-sectional view taken along line 6—6 of FIG. 4.

As shown in FIG. 4, annular recesses 10 and 11 are respectively formed in mutually opposing side surfaces of the rope reel 3 and the cam 6 so that the annular recesses 10 and 11 face each other. A damper spring 12 configuring a resilient means is received in the annular recesses 10 and 11. The damper spring 12 is formed in the shape of a torsion coil spring. As shown in FIG. 4, one end of the damper spring 12 is received in a holding groove 13 formed in the rope reel 3, and the other end of the damper spring 12 is inserted into a holding hole 14 formed in the cam 6. Thus, the rope reel 3 and the cam 6 are resiliently and rotatingly coupled to each other through the damper spring 12. Thus, when the rope reel 3 is rotated in the engine starting direction by pulling the recoil rope 2 and when the rope reel 3 is rotated in the direction opposite to the engine starting direction by the recoil spring 5, the cam 6 is rotated via the damper spring 12 in the engine starting direction and the opposite direction, respectively.

Figure 3:
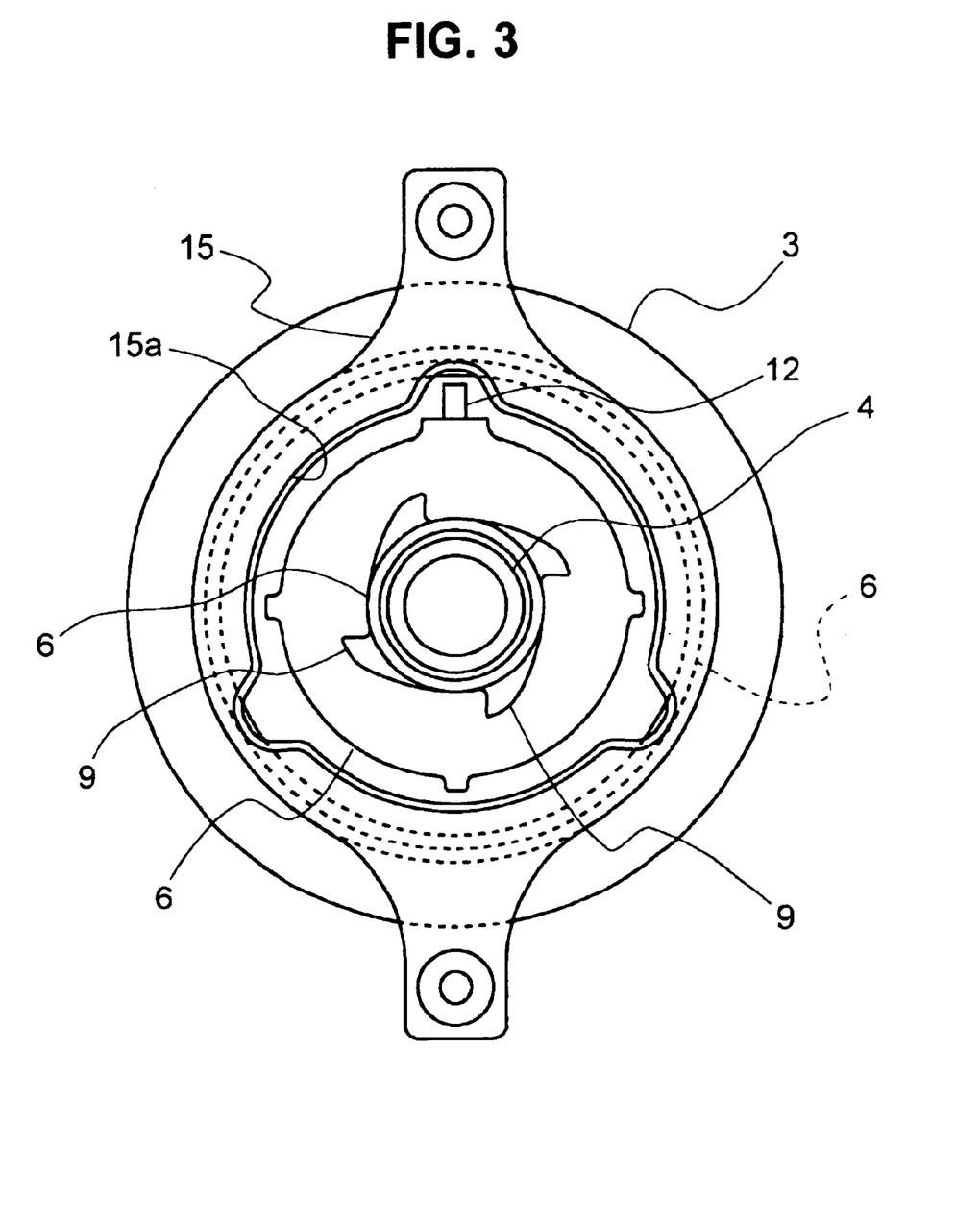
FIG. 3 is a rear view showing the recoil starter of FIG. 1 prior to attaching the recoil starter to an engine.

As shown in FIGS. 3 and 4, an annular plate 15 is secured to the starter housing 1 by screws in order to regulate the movement of the rope reel 3 and the cam 6 supported on the reel support shaft 4 in an axial direction with respect to the reel support shaft 4. The annular plate 15 engages with outer peripheral portions of respective side surfaces of the rope reel 3 and the cam 6 to regulate the movement of the rope reel 3 and the cam 6 in the axial direction of the reel support shaft 4, whereby the cam 6 and the rope reel 3 are prevented from being detached from the reel support shaft 4. The cam pawls 9 formed on the cam 6 project from an opening 15a, which is formed in a center of the annular plate 15, toward the drive pulley 7 attached to the crankshaft C of the engine E.

When the rope reel 3 is rotated by pulling the recoil rope 2, the drive pulley 7 is rotated by the rotation of the rope reel 3 via the damper spring 12, the cam 6 and the centrifugal ratchets 8, whereby the crankshaft C of the engine E coupled to the drive pulley 7 is rotated. Although a rotational load is increased by starting resistance of the engine E and a rotational load of the cam 6 largely fluctuates to generate a shock at this time, the engine E can be smoothly started without the shock being directly transmitted to the recoil rope side because the damper spring 12 is twisted to absorb fluctuations of this rotational load.

The reel support shaft 4 on the inner side of the starter housing 1 is formed to be hollow. An opening 16 is formed trough a center portion of the reel support shaft 4 coaxially with the crankshaft C of the engine E in such a manner that the opening 16 extends from a distal end of the reel support shaft 4 near the crankshaft C to the outside of the starter housing 1. A drive shaft D of a power-driven device, such as a mower or the like, to be coupled to the crankshaft C and driven by the engine E is inserted from the outside of the starter housing 1 and passed through the opening 16 of the reel support shaft 4 so that the drive shaft D can be coupled to the crankshaft C of the engine E. An opening 17 which has a large inner diameter is formed in an outer end portion of the opening 16 of the starter housing 1 so that a pipe P which supports an activation mechanism of the device, such as a cutter portion of the mower, is inserted in the opening 17. As shown in FIG. 4, the pipe P is fitted in the opening 17 so that the device is integrally coupled with the engine E via the starter housing 1 enclosing the recoil starter.

A coupling shaft 20, which has a through-hole 19 of a polygonal section formed in a center portion thereof and which is integrally provided with a nut portion 18 for attaching and fixing the drive pulley 7 to the crankshaft C of the engine E, is arranged. The coupling shaft 20 is disposed inside the opening 16 formed in the center portion of the reel support shaft 4 of the starter housing 1 in a state where the nut portion 18 is screwed onto the crankshaft C of the engine E in order to attach the drive pulley 7 to the crankshaft C. The drive shaft D, which rotatingly drives a rotary cutter or the like of the mower serving as an example of the power-driven device, is disposed in a center portion of the pipe P. By inserting an end portion of the drive shaft D into the polygonal through-hole 19 of the coupling shaft 20, the crankshaft C of the engine E is rotatingly coupled to the drive shaft D via the coupling shaft 20, whereby the rotation of the crankshaft C is transmitted to the rotary cutter of the mower. That is, the device can be disposed on the side of the engine E where the end portion of the crankshaft C is arranged while the drive shaft D of the device passes through the center portion of the recoil starter and is coupled to the crankshaft C of the engine E.

Figure 7:
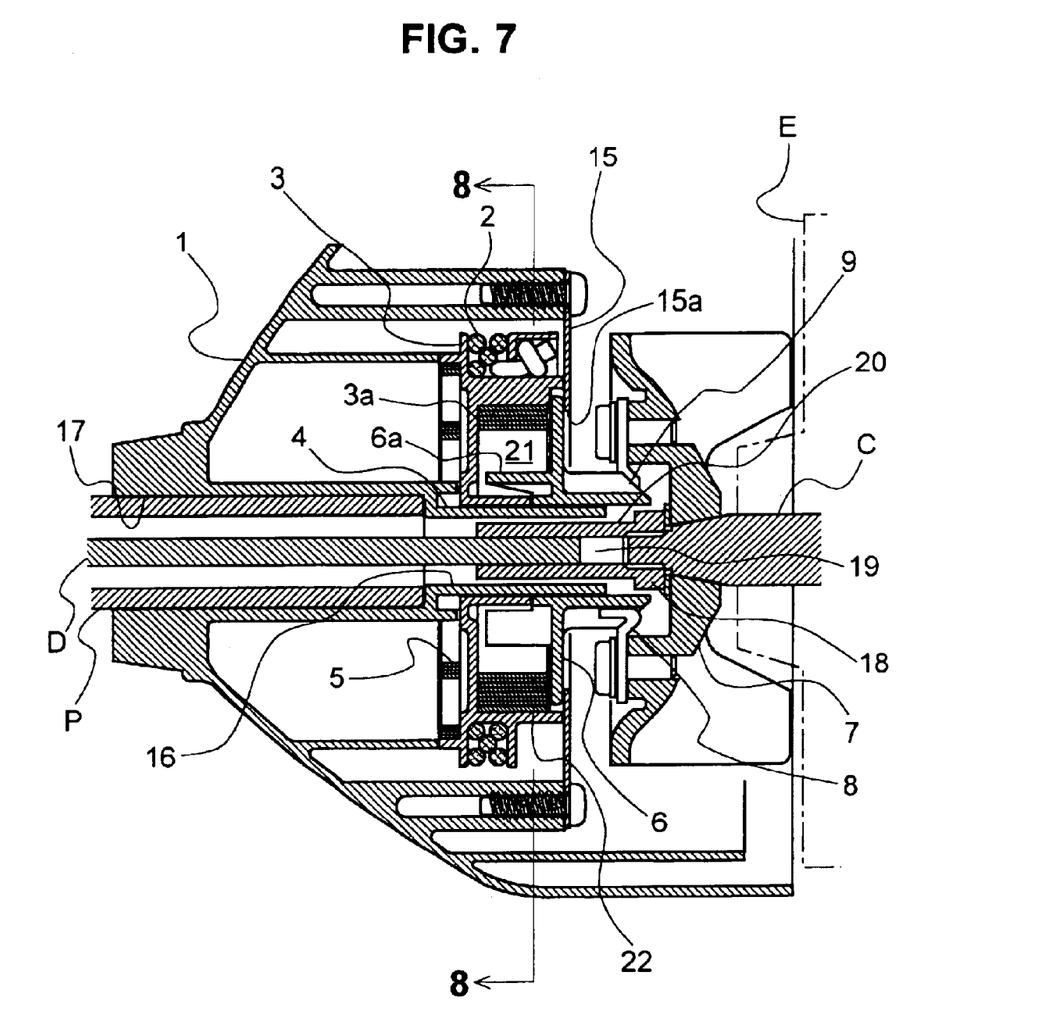
FIG. 7 is an elevational sectional view showing a recoil starter according to another embodiment of the invention.

Next, a recoil starter according to another embodiment of the invention shown in FIGS. 7 and 8 will be described. As shown in FIG. 7, in the recoil starter according to this embodiment, similar to the embodiment described above, the rope reel 3 having the recoil rope 2 wound thereon and the cam 6 that transmits rotation to the drive pulley 7 attached to the crankshaft C of the engine E are rotatably supported on the reel support shaft 4 formed on the inner surface of the starter housing 1 attached to one side of the engine E. The recoil spring 5 for rotating the rope reel 3 in the opposite direction to rewind the recoil rope 2 pulled out from the rope reel 3 is disposed on the side surface of the rope reel 3. The cam pawls 9 are formed on the cam 6 at intervals in the circumferential direction thereof. Rotation of the cam 6 is transmitted to the engine E via the centrifugal ratchets 8 provided on the drive pulley 7.

Figure 8:
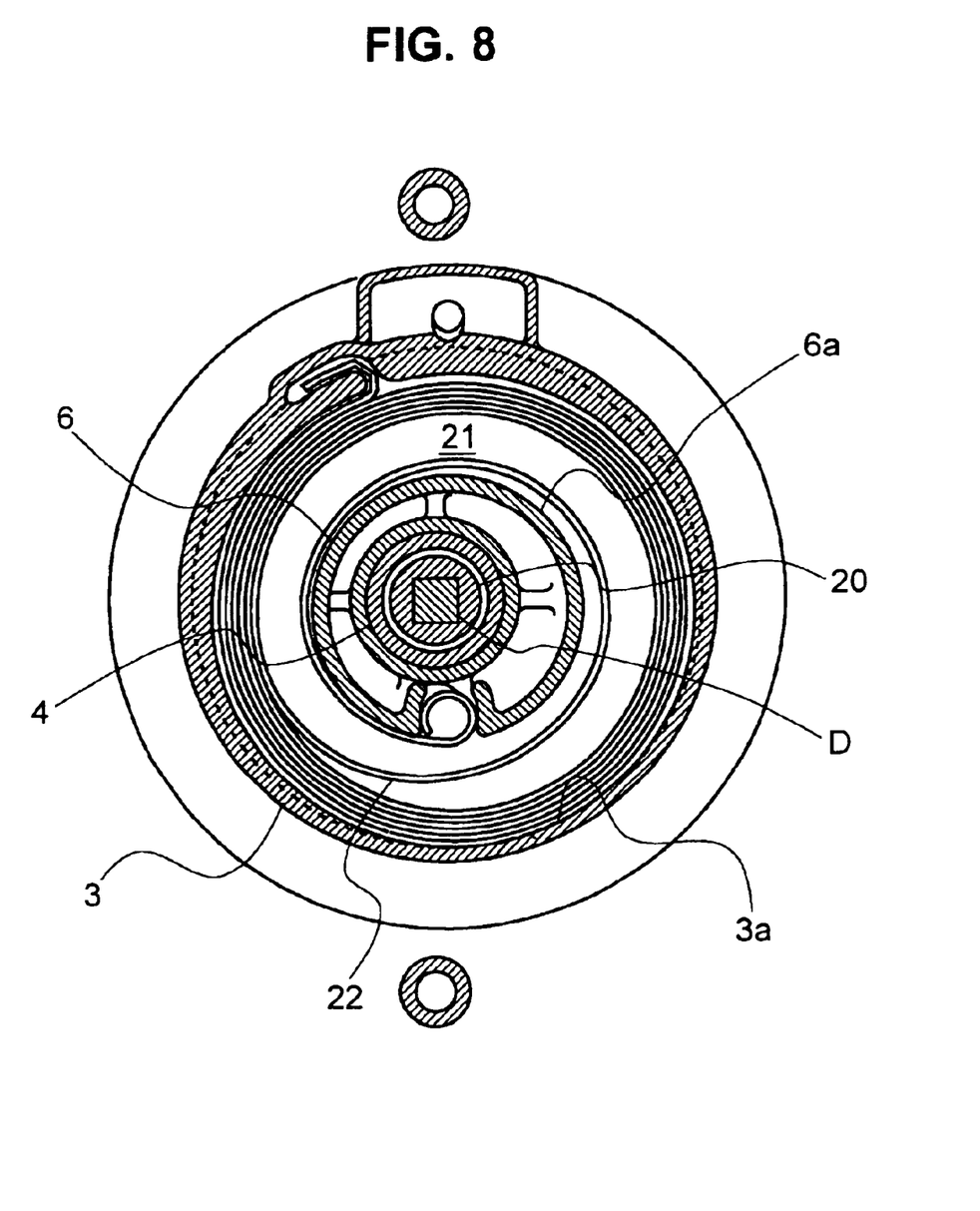
FIG. 8 is a cross-sectional view taken along line 8—8 of FIG. 7.

Moreover, in the recoil starter of the present embodiment, as shown in FIG. 8, the cam 6 is provided thereon with a boss portion 6a which is disposed inside a recess formed in the side surface of the rope reel 3. An annular recess 21 is formed between an inner peripheral surface 3a of the recess of the rope reel 3 and an outer peripheral surface of the boss portion 6a of the cam 6. A spiral spring 22 serving as a resilient means is received inside the annular recess 21. An end portion of an outer peripheral side of the spiral spring 22 is held on the rope reel 3, and an end portion of the inner peripheral side of the spiral spring 22 is held on the boss portion 6a of the cam 6, whereby the rope reel 3 and the cam 6 are resiliently and rotatingly coupled via the spiral spring 22. The cam 6 is rotated, concurrent with the rotation of the rope reel 3, in the engine starting direction and in the opposite direction via the spiral spring 22. Also, the spiral spring 22 is adapted to be twisted when the rope reel 3 is relatively rotated with respect to the cam 6, whereby a shock resulting from fluctuations in the load of the cam 6 is buffered and the rotational force of the rope reel 3 is accumulated in the spiral spring 22.

When the recoil rope 2 is pulled so as to rotate the rope reel 3, the rotational force of the rope reel 3 is transmitted to the cam 6 via the spiral spring 22, so that the rotation of the cam 6 causes the drive pulley 7 to rotate via the centrifugal ratchets 8, resulting in the crankshaft C of the engine E coupled to the drive pulley 7 being rotated. Although the rotational load of the cam 6 is increased by the starting resistance of the engine E and a shock resulting from the fluctuations in the rotational load of the cam 6 is generated at the rope reel 3 at this time, the spiral spring 22 interposed between the cam 6 and the rope reel 3 is twisted to absorb the fluctuations in the load, and the rotational force is accumulated in the spiral spring 22. The rotational force accumulated in the spiral spring 22 is released at the time the engine E is started, so that the engine E can be started more smoothly.

Similar to the preceding embodiment, the opening 16 is formed in the center of the reel support shaft 4 coaxially with the crankshaft C of the engine E. The opening 16 extends from the distal end of the reel support shaft 4 near the crankshaft C to the outside of the starter housing 1. The drive shaft D of the power-driven device that is driven by the engine E and disposed on the outside of the starter housing 1 can be coupled to the crankshaft C inside the starter housing 1. The coupling shaft 20, which has the through-hole 19 of a polygonal section formed in the center portion thereof and which is integrally provided with the nut portion 18 for attaching and fixing the drive pulley 7 to the crankshaft C of the engine E, is arranged. The coupling shaft 20 is disposed inside the opening 16 in the center portion of the reel support shaft 4 formed on the starter housing 1. By inserting the drive shaft D of the device from the outside of the starter housing 1 and inserting the end portion of the drive shaft D into the polygonal through-hole 19 of the coupling shaft 20, the crankshaft C of the engine E is rotatingly coupled to the drive shaft D via the coupling shaft 20, so that the rotation of the crankshaft C is transmitted to the rotary cutter of the mower. That is, the device can be disposed on the side of the engine E where the end portion of the crankshaft C is arranged while the drive shaft D of the device is passed through the center portion of the recoil starter and coupled to the crankshaft C of the engine E.

Figure 9:
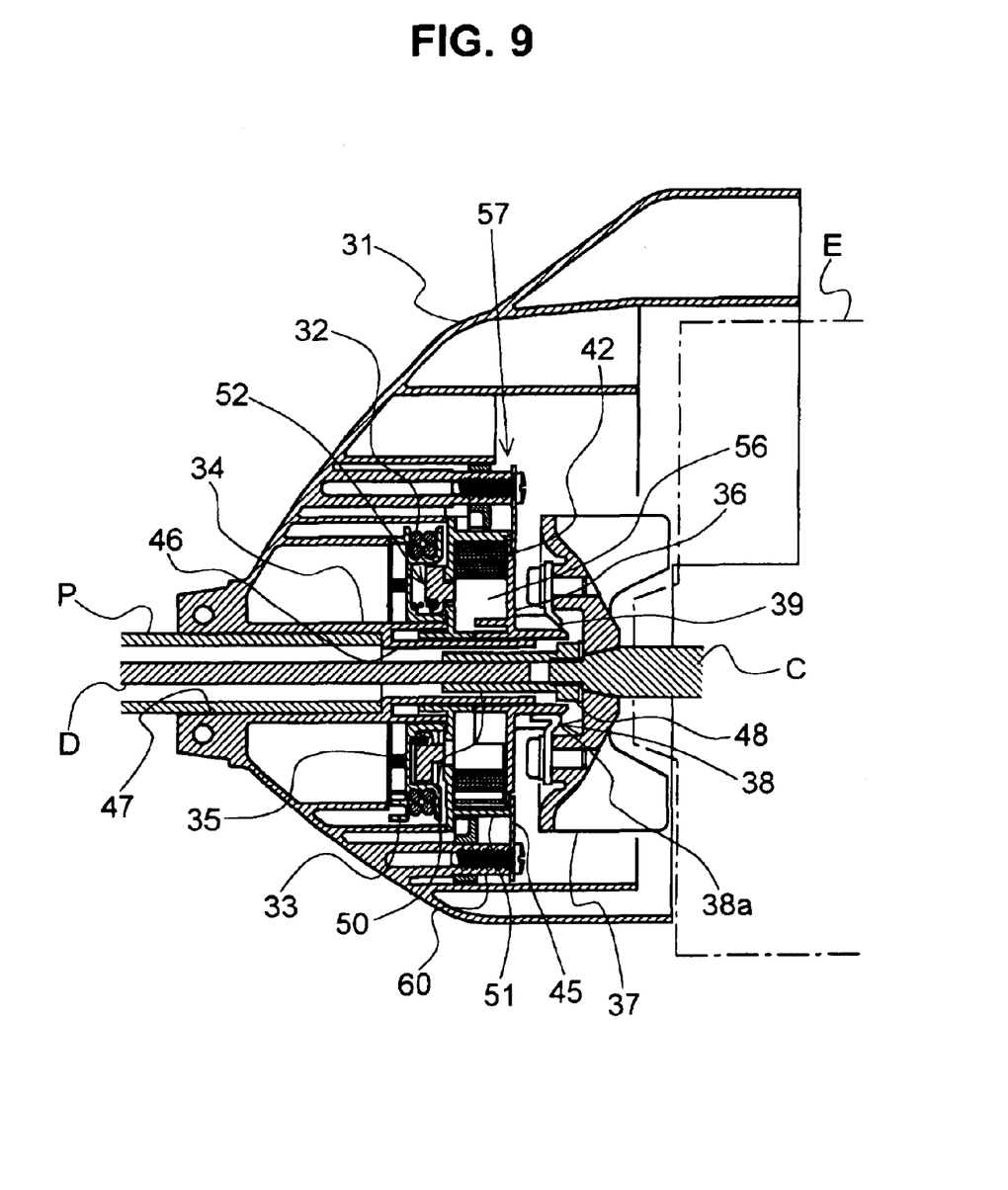
FIG. 9 is an elevational sectional view showing a recoil starter according to yet another embodiment of the invention.

Next, a recoil starter according to yet another embodiment of the invention shown in FIGS. 9 to 12 will be described. As shown in FIG. 9, a main mechanism of the recoil starter is mounted inside a starter housing 31 that is formed to be attachable to one side of an engine E at which an end portion of a crankshaft C is disposed. A reel support shaft 34 is integrally formed on the starter housing 31 so as to project from an inner wall surface of the starter housing 31 toward the crankshaft C of the engine E. A rope reel 33 having a recoil rope 32 wound thereon, one end of which is pulled out to the outside of the starter housing 31, is rotatably supported on the reel support shaft 34. One end of the recoil rope 32 wound around the rope reel 33 is fixed at the rope reel 33, and the other end of the recoil rope 32 is pulled out to the outside of the starter housing 31. The recoil rope 32 is pulled out from the rope reel 33 by pulling an operating handle (not shown) joined to an end portion of the recoil rope 32, whereby the rope reel 33 is rotatingly driven around the reel support shaft 34 in an engine starting direction.

A recoil spring 35 is disposed on a side surface of the rope reel 33 so as to rotate the rope reel 33 in a direction opposite to the engine starting direction, to thereby rewind the recoil rope 32, which has been pulled out by pulling the recoil rope 32, around the rope reel 33. One end of an inner peripheral side of the recoil spring 35 is fixed to the starter housing 31, and the other end of an outer peripheral side of the recoil spring 35 is fixed to the rope reel 33. When the recoil rope 32 is pulled and the rope reel 33 is rotated in the direction in which the engine E is started, a rotational force is accumulated in the recoil spring 35. By releasing the recoil rope 32 or lessening the pulling force, the rope reel 33 is rotated in the opposite direction by the rotational force accumulated in the recoil spring 35, whereby the recoil rope 32 is rewound around the rope reel 33.

A drive wheel 51 is rotatably supported, so as to be adjacent to the rope reel 33, on the reel support shaft 34 formed on the starter housing 31. A one-way clutch 52 that transmits the rotation of the rope reel 33 in the engine starting direction to the drive wheel 51 is provided between the rope reel 33 and the drive wheel 51. The one-way clutch 52 is configured by a clutch member 53, a clutch spring 54 and recesses 55. The clutch member 53 is received inside a recess formed in a side surface of the rope reel 33 facing the drive wheel 51, and is urged toward the drive wheel 51 by the clutch spring 54. The recesses 55, which are engageable with the clutch member 53, are formed in a side surface of the drive wheel 51 facing the clutch member 53. Due to the provision of the one-way clutch 52, when the recoil rope 32 is pulled, rotation of the rope reel 33 in the engine starting direction is transmitted to the drive wheel 51, whereas when the rope reel 33 is rotated in the opposite direction to rewind the recoil rope 32 around the rope reel 33, transmission of the rotation of the rope reel 33 is blocked, whereby the rotational force in the opposite direction is not transmitted to the drive wheel 51.

Moreover, a cam 36 that transmits rotation to the crankshaft C of the engine E is rotatably supported on the reel support shaft 34. As shown in FIG. 9, a centrifugal clutch mechanism 38, which configures a one-way rotative mechanism that transmits the rotation of the cam 36 in the engine starting direction to a flywheel magnet 37 that is integrally joined to the crankshaft C of the engine E, is provided between the cam 36 and the flywheel magnet 37. The centrifugal clutch mechanism 38 is configured by centrifugal ratchets 38a, which are disposed on the flywheel magnet 37 and rotatingly activated by centrifugal force, and cam pawls 39, which are formed on an outer peripheral surface of the cam 36 and with which the centrifugal ratchets 38a disengageably engage. Rotation of the cam 36 in the engine starting direction is transmitted to the crankshaft C of the engine E by engagement of the cam pawls 39 with the centrifugal ratchets 38a of the flywheel magnet 37. After the engine E has been started, the flywheel magnet 37 is rotated by the engine E, whereby the centrifugal ratchets 38a are rotated by centrifugal force in a direction in which they disengage from the cam pawls 39 and transmission of rotation between the engine E and the cam 36 is blocked.

Figure 12:
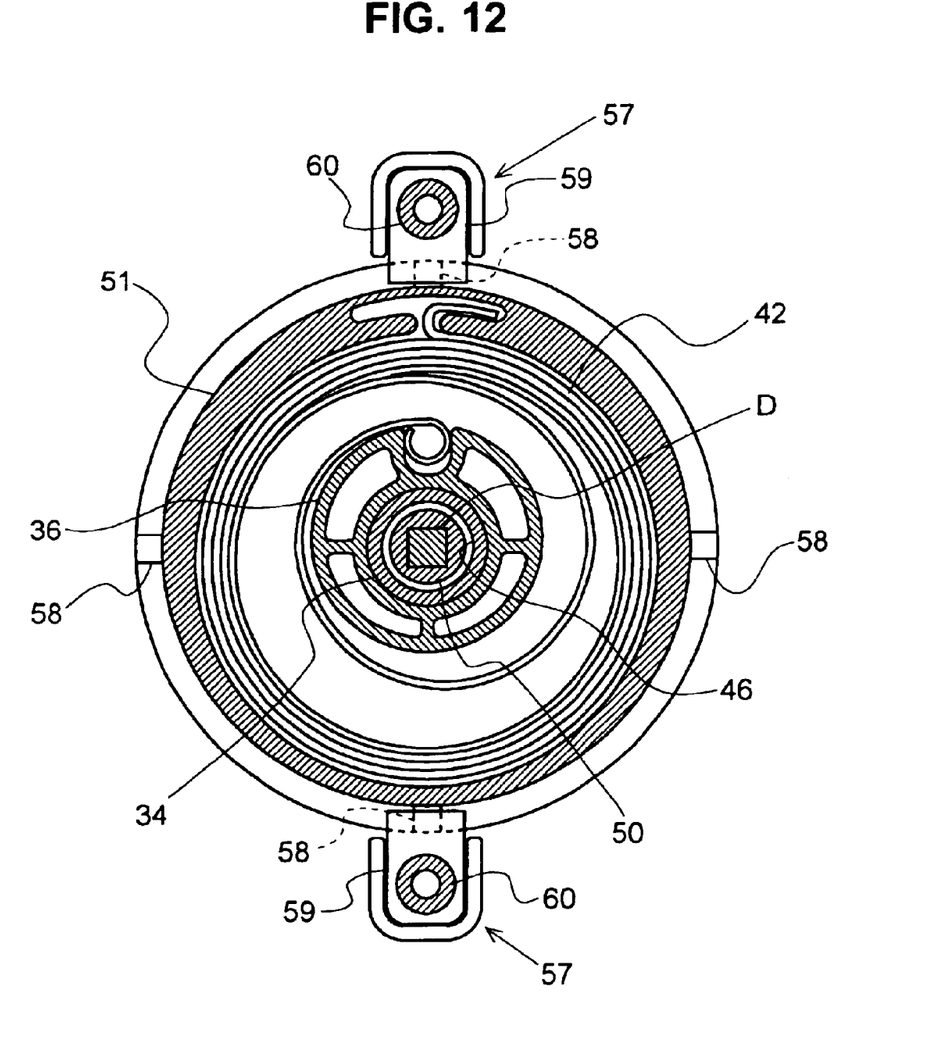
FIG. 12 is a cross-sectional view taken along line, 12—12 of FIG. 10.

A recess 56 is formed in a side surface of the drive wheel 51 facing the cam 36 so as to be open in one direction. A spiral spring 42 configuring an accumulation means is received inside the recess 56. As shown in FIG. 12, an outer peripheral side end of the spiral spring 42 is held on the drive wheel 51, and an inner peripheral side end of the spiral spring 42 is held on the cam 36. The drive wheel 51 and the cam 36 are thus rotatingly coupled via the spiral spring 42. When the drive wheel 51 is rotated by the rope reel 33, the cam 36 is rotated via the spiral spring 42. However, when the starting load of the engine E becomes large and the rotational resistance of the cam 36 increases to stop the rotation of the cam 36, the spiral spring 42 is wound by the drive wheel 51 that is rotated by the rope reel 33, whereby the rotational force is accumulated in the spiral spring 42.

A ratchet mechanism 57 that allows the drive wheel 51 to rotate only in the engine starting direction is disposed between the drive wheel 51 and the starter housing 31. The ratchet mechanism 57 is configured by engagement teeth 58 formed on an outer peripheral edge of the drive wheel 51 and ratchets 59 that engage with and disengage from the engagement teeth 58. The ratchets 59 are each supported on a support shaft 60 formed on the starter housing 31 so as to slide in an axial direction of the support shaft 60. The ratchets 59 are each urged by a spring in a direction in which the ratchets 59 engage with the engagement teeth 58. When the drive wheel 51 is rotated in the engine starting direction due to the rotation of the rope reel 33, the ratchets 59 are moved in the direction in which they disengage from the engagement teeth 58 counter to urging force of the springs, so that the engagement of the ratchets 59 with the engagement teeth 58 is released, resulting in rotation of the drive wheel 51 being allowed. However, when the drive wheel 51 is to be rotated by the spiral spring 42 in the direction opposite to the engine starting direction in a state where rotational force is accumulated in the spiral spring 42, the ratchets 59 engage with the engagement teeth 58 so that the rotation of the drive wheel 51 in the opposite direction is obstructed.

Figure 10:
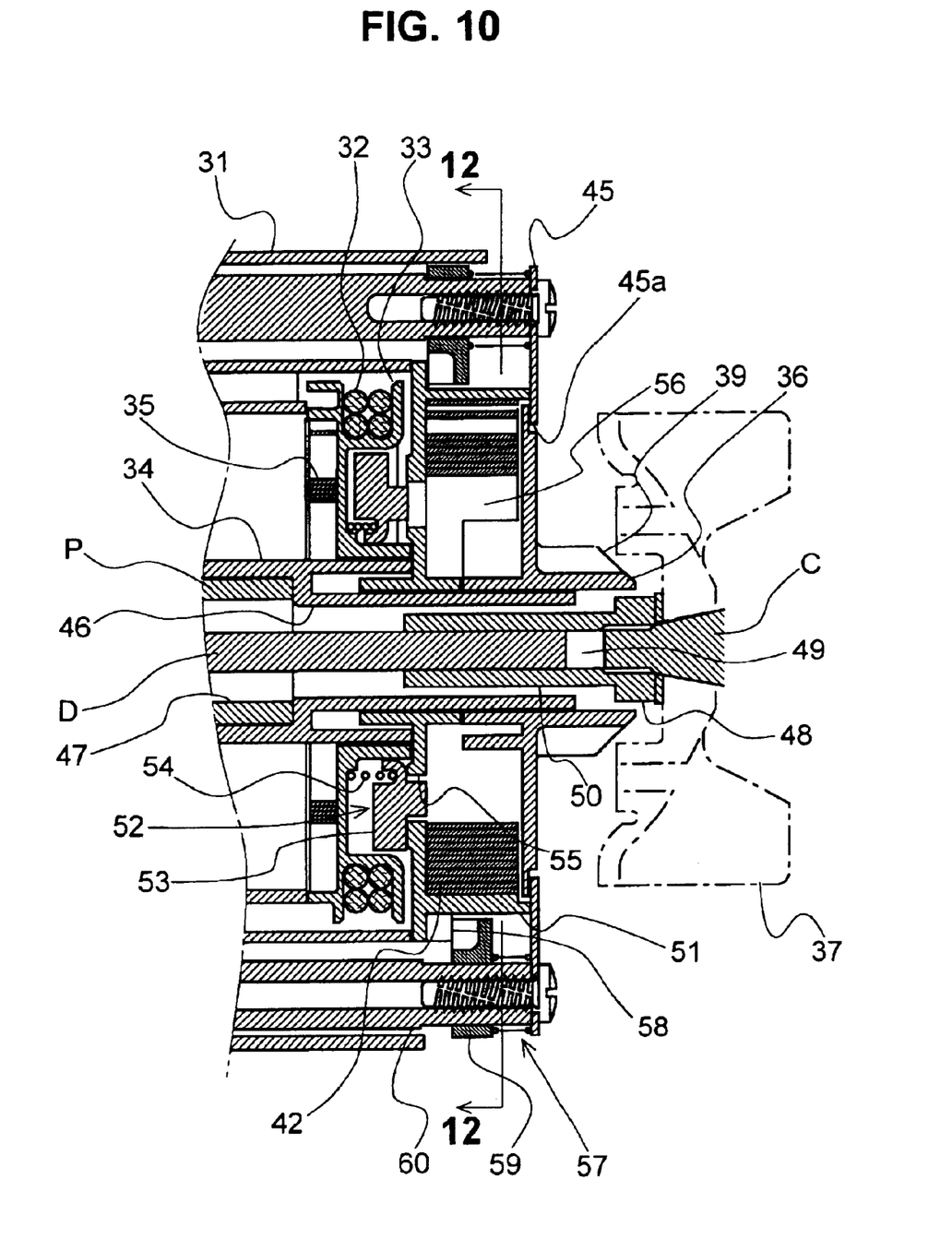
FIG. 10 is an enlarged elevational sectional view showing an essential part of the recoil starter of FIG. 9.
Figure 11:
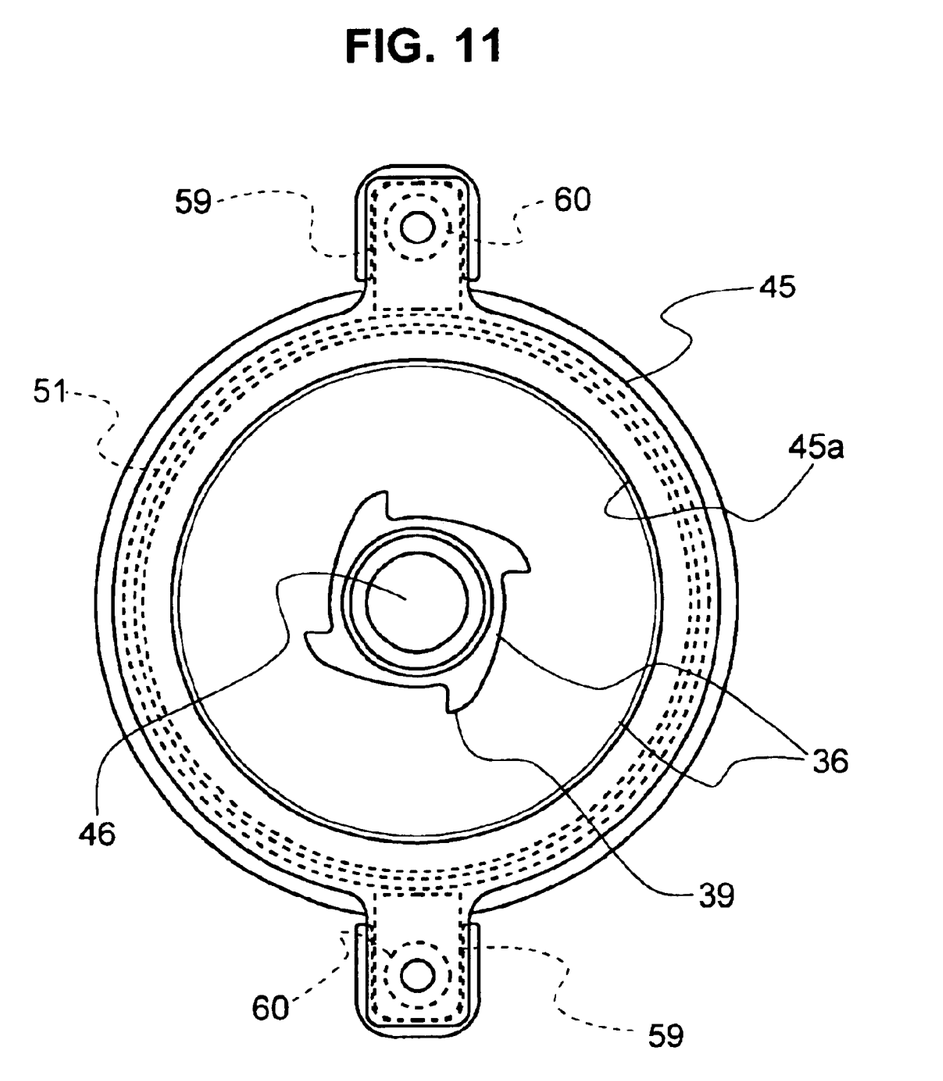
FIG. 11 is a rear view showing the recoil starter of FIG. 9 prior to attaching the recoil starter to an engine.

As shown in FIGS. 10 and 11, an annular plate 45 is attached to the starter housing 31 by screws. An opening 45a is formed in a center portion of the annular plate 45. The outer peripheral portions of the side surfaces of the drive wheel 51 and the cam 36 rotatably supported on the reel support shaft 34 engage with an annular portion of the annular plate 45, so that movement of the drive wheel 51 and the cam 36 in the axial direction of the reel support shaft 34 is regulated, whereby the drive wheel 51 and the cam 36 are prevented from being detached from the reel support shaft 34. The cam pawls 39 formed on the cam 36 project from the opening 45a formed in the center of the annular plate 45 toward the flywheel magnet 37 attached to the crankshaft C of the engine E.

When the drive wheel 51 is rotated by the rope reel 33 rotated by pulling the recoil rope 32, rotation is transmitted to the engine E via the spiral spring 42, the cam 36 and the centrifugal clutch mechanism 38. However, when the rotation of the cam 36 is obstructed by the starting resistance of the engine E, the drive wheel 51 rotated by the rope reel 33 winds up the spiral spring 42 and rotational force is accumulated in the spiral spring 42. When the pulling force of the recoil rope 32 is lessened, the rope reel 33 rotates in the opposite direction due to the action of the recoil spring 35 to rewind the recoil rope 32, whereas rotation of the drive wheel 51 in the opposite direction is obstructed by the ratchet mechanism 57, so that the rotational force accumulated in the spiral spring 42 is maintained without the drive wheel 51 rotating in the opposite direction. In this manner, when the recoil rope 32 is repeatedly pulled and the rotational force accumulated in the spiral spring 42 exceeds the starting resistance of the engine E acting on the cam 36, the cam 36 is abruptly rotated by the rotational force accumulated in the spiral spring 42, whereby the flywheel magnet 37 is rotated via the centrifugal ratchet mechanism 38, resulting in the engine E being started. Although the accumulation means in the present embodiment is configured by the spiral spring 42, instead, the accumulation means may comprise a torsion coil spring having one end thereof engaged with the drive wheel 51 and the other end thereof engaged with the cam 36.

An opening 46 is formed in a center portion of the reel support shaft 34 formed on the starter housing 31. The opening 46 penetrates the reel support shaft 34 to the outside of the starter housing 31 on the extension of the crankshaft C of the engine E. A drive shaft D of a power-driven device to be coupled with the crankshaft C of the engine E is inserted from the outside of the starter housing 31 and passed through the opening 46 of the reel support shaft 34, whereby the drive shaft D can be coupled to the crankshaft C inside the starter housing 31. An opening 47 which has a large inner diameter is formed in an outer end portion of the opening 46 of the starter housing 31. The opening 47 has fitted therein a pipe P supporting an activation mechanism of the device, such as a cutter portion of a mower, so that the device is coupled to the engine E via the starter housing 31 enclosing the recoil starter.

A coupling shaft 50, which has a through-hole 49 of a polygonal section formed in a center portion thereof and which is integrally formed with a nut portion 48 that attaches and fixes the flywheel magnet 37 to the crankshaft C of the engine E, is provided. The coupling shaft 50 is disposed inside the opening 46 formed in the center portion of the reel support shaft 34 of the starter housing 31 in a state where the nut portion 48 is screwed onto the crankshaft C in order to attach the flywheel magnet 37 to the crankshaft C of the engine E. The drive shaft D that drives a rotary cutter or the like of the mower is disposed in the center portion of the pipe P coupling the mower to the engine E. By inserting an end portion of the drive shaft D into the polygonal through-hole 49 of the coupling shaft 50, the crankshaft C of the engine E and the drive shaft D are coupled via the coupling shaft 50 while the drive shaft D passes through the recoil starter, whereby the rotation of the crankshaft C is transmitted to the rotary cutter of the mower. That is, the device can be disposed on the side of the engine E where the end portion of the crankshaft C is arranged while the drive shaft D of the device passes through the center portion of the recoil starter and is coupled to the crankshaft C of the engine E.

As described above, according to the invention, the opening that extends to the outside of the starter housing along the axial line of the crankshaft of the engine is formed in the center portion of the reel support shaft formed on the starter housing, and the drive shaft of the device is coupled to the crankshaft of the engine inside the opening. Such construction permits rotational output of the crankshaft of the engine to be taken out to the outside of the starter housing while passing through the center portion of the starter housing via the opening of the reel support shaft. Accordingly, it is possible to dispose the recoil starter between the engine and the device driven by the engine even when the engine has a cantilever-type crankshaft disposed only at one side thereof.

In one embodiment of the invention, the damper, such as a torsion coil spring or a spiral spring, is interposed between the rope reel and the cam, so that a shock resulting from fluctuations in the starting load of the engine can be buffered by the damper and is not transmitted to the rope reel. Moreover, since the rotational force of the rope reel is accumulated in the damper and the rotational force thus accumulated is released to start the engine, the engine can be started easily.

In one embodiment of the invention, since the drive wheel is interposed between the rope reel and the cam and the accumulation means is disposed between the drive wheel and the cam, the rotational force is accumulated in the accumulation means by repeatedly pulling the recoil rope, so that the crankshaft of the engine can be rotated by the rotational force accumulated in the accumulation means. Thus, it is possible for the engine to be started easily.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A recoil starter comprising:
   a starter housing adapted to be attachable to a side of an engine at which an end portion of a crankshaft of the engine is disposed;
   a rope reel rotatably supported inside said starter housing and around which is wound a recoil rope having an end pulled out to the outside of said starter housing;
   a cam rotatably supported coaxially with said rope reel and adapted to be rotated by rotation of said rope reel so as to cause said crankshaft of the engine to rotate via a one-way rotative mechanism; and
   a resilient means, interposed between said rope reel and said cam, for resiliently and rotatingly coupling said rope reel and said cam, a rotational force of said rope reel rotated by pulling said recoil rope being transmitted to said cam via said resilient means; wherein
   a reel support shaft for rotatably supporting said rope reel and said cam inside said starter housing is formed on and projects from an inner surface of said starter housing toward the crankshaft of the engine;
   an opening is formed through a center of said reel support shaft in a manner to extend from a distal end thereof near the crankshaft of the engine to the outside of said starter housing; and a drive shaft of a power-driven device which is driven by the engine and disposed at the outside of said starter housing is coupled to the crankshaft of the engine inside said opening, wherein an annular plate is secured to said starter housing so that said rope reel and said cam are brought at outer peripheral portions of respective side surfaces thereof into abutment against said annular plate, whereby said rope reel and said cam are supported so that they are not detached in an axial direction from said reel support shaft.

2. The recoil starter according to claim 1, wherein said resilient means comprises a damper having one end thereof coupled to said rope reel and the other end thereof coupled to said cam so that said damper is adapted to buffer a shock resulting from fluctuations in a starting load of the engine and transmitted to said cam.

3. The recoil starter according to claim 2, wherein said damper comprises a torsion coil spring having one end thereof engaged with said rope reel and the other end thereof engaged with said cam.

4. The recoil starter according to claim 2, wherein said damper is a spiral spring having one end thereof engaged with said rope reel and the other end thereof engaged with said cam.

5. The recoil starter according to claim 2, wherein said one-way rotative mechanism comprises a cam pawl formed on an outer peripheral surface of said cam and a centrifugal ratchet provided on a rotating member which is attached to the crankshaft of the engine, said centrifugal ratchet being adapted to engage with and disengage from said cam pawl due to a centrifugal force caused by rotation of said rotating member.

6. The recoil starter according to claim 3, wherein said one-way rotative mechanism comprises a cam pawl formed on an outer peripheral surface of said cam and a centrifugal ratchet provided on a rotating member which is attached to the crankshaft of the engine, said centrifugal ratchet being adapted to engage with and disengage from said cam pawl due to a centrifugal force caused by rotation of said rotating member.

7. The recoil starter according to claim 4, wherein said one-way rotative mechanism comprises a cam pawl formed on an outer peripheral surface of said cam and a centrifugal ratchet provided on a rotating member which is attached to the crankshaft of the engine, said centrifugal ratchet being adapted to engage with and disengage from said cam pawl due to a centrifugal force caused by rotation or said rotating member.

8. A recoil starter comprising:

a starter housing adapted to be attachable to a side of an engine at which an end portion of a crankshaft of the engine is disposed;

a rope reel rotatably supported inside said starter housing and around which is wound a recoil rope having an end pulled out to the outside of said starter housing;

a cam rotatably supported coaxially with said rope reel and adapted to be rotated by rotation of said rope reel so as to cause said crankshaft of the engine to rotate via a one-way rotative mechanism;

a resilient means, interposed between said rope reel and said cam, for resiliently and rotatingly coupling said rope reel and said cam, a rotational force of said rope reel rotated by pulling said recoil rope being transmitted to said cam via said resilient means;

a drive wheel disposed between said rope reel and said cam so that said drive wheel is permitted to rotate only in one direction through means of a one-way clutch provided between said rope reel and said drive wheel, wherein said resilient means is configured as an accumulation means for accumulating the rotational force of the rope reel side, and wherein said accumulation means is interposed between said drive wheel and said cam so as to accumulate a rotational force of said drive wheel rotated by said rope reel, whereby said cam is rotatingly driven by the rotational force accumulated in said accumulation means to cause the crankshaft of the engine to rotate;

a reel support shaft for rotatably supporting said rope reel and said cam inside said starter housing is formed on and projects from an inner surface of said starter housing toward the crankshaft of the engine;

an opening is formed through a center of said reel support shaft in a manner to extend from a distal end thereof near the crankshaft of the engine to the outside of said starter housing;

an annular plate is secured to said starter housing so that the drive wheel and the cam are brought at outer peripheral portions of respective side surfaces thereof into abutment against the annular plate, whereby the drive wheel and the cam are supported so that they are not detached in an axial direction from said reel support shaft; and a drive shaft of a power-driven device which is driven by the engine and disposed at the outside of said starter housing is coupled to the crankshaft of the engine inside said opening.

9. The recoil starter according to claim 8, wherein said accumulation means comprises a spiral spring having one end thereof engaged with said drive wheel and the other end thereof engaged with said cam.

10. The recoil starter according to claim 9, further comprising a ratchet mechanism configured by an engagement tooth formed at an outer peripheral edge of said drive wheel and a ratchet supported on said starter housing so that said ratchet is engageable with said engagement tooth, wherein said ratchet mechanism permits said drive wheel to rotate only in an engine starting direction.

11. The recoil starter according to claim 8, further comprising a ratchet mechanism configured by an engagement tooth formed at an outer peripheral edge of said drive wheel and a ratchet supported on said starter housing so that said ratchet is engageable with said engagement tooth, wherein said ratchet mechanism permits said drive wheel to rotate only in an engine starting direction.

12. A recoil starter comprising:

a starter housing adapted to be attachable to a side of an engine at which an end portion of a crankshaft of the engine is disposed a rope reel rotatably supported inside said starter housing and around which is wound a recoil rope having an end pulled out to the outside of said starter housing;

a cam rotatably supported coaxially with said rope reel and adapted to be rotated by rotation of said rope reel so as to cause said crankshaft of the engine to rotate via a one-way rotative mechanism;

a resilient means, interposed between said rope real and said cam, for resiliently and rotatingly coupling said rope reel and said cam, a rotational force of said rope reel rotated by pulling said recoil rope being transmitted to said cam via said resilient means;

a reel support shaft, formed on and projecting from an inner surface of said starter housing toward the crankshaft of the engine, for rotatably supporting said rope reel and said cam inside said starter housing; and an annular plate secured to said starter housing so that said cam is brought at a side surface thereof into abutment against said annular plate, whereby said rope reel and said cam are supported so that they are not detached in an axial direction from said reel support shaft.

13. The recoil starter according to claim 12, wherein an opening is formed through a center of said reel support shaft in a manner to extend from a distal end thereof near the crankshaft of the engine to the outside of said starter housing; and a drive shaft of a power-driven device which is driven by the engine and disposed at the outside of said starter housing is coupled to the crankshaft of the engine inside said opening.

14. The recoil starter according to claim 12, wherein said resilient means comprises a damper having one end thereof coupled to said rope reel and the other end thereof coupled to said cam so that said damper is adapted to buffer a shack resulting from fluctuations in a starting load of the engine and transmitted to said cam.

15. The recoil starter according to claim 14, wherein said damper comprises a torsion coil spring having one end thereof engaged with said rope reel and the other end thereof engaged with said cam.

16. The recoil starter according to claim 14, wherein said damper is a spiral spring having one end thereof engaged with said rope reel and the other end thereof engaged with said cam.

17. The recoil starter according to claim 14, wherein said one-way rotative mechanism comprises a cam pawl formed on an outer peripheral surface of said cam and a centrifugal ratchet provided on a rotating member which is attached to the crankshaft of the engine, said centrifugal ratchet being adapted to engage with and disengage from said cam pawl due to a centrifugal force caused by rotation of said rotating member.

18. The recoil starter according to claim 12, further comprising a drive wheel disposed between said rope reel and said cam so that said drive wheel is permitted to rotate only in one direction through means of a one-way clutch provided between said rope reel and said drive wheel, wherein said resilient means is configured as an accumulation means for accumulating the rotational force of the rope reel side, and wherein said accumulation means is interposed between said drive wheel and said cam so as to accumulate a rotational force of said drive wheel rotated by said rope reel, whereby said cam is rotatingly driven by the rotational force accumulated in said accumulation means to cause the crankshaft of the engine to rotate.

* * * * *